United States Patent
Yang et al.

(10) Patent No.: US 10,884,531 B2
(45) Date of Patent: Jan. 5, 2021

(54) DIGITIZER, SIGNAL TRANSMISSION DEVICE, DIGITIZER DEVICE AND CONTROL METHODS THEREOF

(71) Applicants: BOE Technology Group Co., Ltd., Beijing (CN); Hefei BOE Optoelectronics Technology Co., Ltd., Anhui (CN)

(72) Inventors: Huaiwei Yang, Beijing (CN); Dandan Li, Beijing (CN); Chaozhi Yu, Beijing (CN)

(73) Assignees: BOE TECHNOLOGY GROUP CO., LTD., Beijing (CN); HEFEI BOE OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 16/169,413

(22) Filed: Oct. 24, 2018

(65) Prior Publication Data
US 2019/0121478 A1    Apr. 25, 2019

(30) Foreign Application Priority Data

Oct. 25, 2017    (CN) .......................... 2017 1 1014772

(51) Int. Cl.
| | | |
|---|---|---|
| G06F 3/041 | (2006.01) | |
| G06F 3/042 | (2006.01) | |
| G06F 3/0354 | (2013.01) | |

(52) U.S. Cl.
CPC ........ *G06F 3/0412* (2013.01); *G06F 3/03542* (2013.01); *G06F 3/03545* (2013.01);
(Continued)

(58) Field of Classification Search
None
See application file for complete search history.

(56) References Cited

U.S. PATENT DOCUMENTS

| | | |
|---|---|---|
| 8,624,846 B2 | 1/2014 | Fukunaga et al. |
| 8,648,839 B2 | 2/2014 | Liaw et al. |
| (Continued) | | |

FOREIGN PATENT DOCUMENTS

| | | |
|---|---|---|
| CN | 1690939 A | 11/2005 |
| CN | 101452136 A | 6/2009 |
| (Continued) | | |

OTHER PUBLICATIONS

Second Office Action, including Search Report, for Chinese Patent Application No. 201711014772.0, dated Feb. 28, 2020, 25 pages.

*Primary Examiner* — Duane N Taylor, Jr.
(74) *Attorney, Agent, or Firm* — Westman, Champlin & Koehler, P.A.

(57) ABSTRACT

A digitizer, a signal transmission device, a digitizer device and control methods thereof are provided. The digitizer includes an operating panel and a first processor. The operating panel is provided with multiple photoelectric sensors. The multiple photoelectric sensors receive an external optical signal, convert the optical signal into an electric signal, and transmit the electric signal to the first processor. The first processor is configured to determine, in accordance with the electric signal, a location where the optical signal is received.

17 Claims, 5 Drawing Sheets

(52) U.S. Cl.
CPC ............ *G06F 3/042* (2013.01); *G06F 3/0414* (2013.01); *G06F 3/0418* (2013.01); *G06F 3/04162* (2019.05)

(56) References Cited

U.S. PATENT DOCUMENTS

| | | | |
|---|---|---|---|
| 8,727,557 B2 | 5/2014 | Yuan et al. | |
| 8,780,089 B2 | 7/2014 | Yuan et al. | |
| 8,816,993 B2 | 8/2014 | Yuan et al. | |
| 8,917,262 B2 | 12/2014 | Liaw et al. | |
| 9,063,597 B2 | 6/2015 | Liaw et al. | |
| 9,430,058 B2 | 8/2016 | Wang et al. | |
| 9,665,189 B2 | 5/2017 | Wang et al. | |
| 2005/0237313 A1 | 10/2005 | Yoshida | |
| 2007/0080956 A1 | 4/2007 | Fann | |
| 2009/0146992 A1 | 6/2009 | Fukunaga et al. | |
| 2011/0169775 A1 | 7/2011 | Liaw et al. | |
| 2013/0027350 A1 | 1/2013 | Liaw et al. | |
| 2013/0027358 A1 | 1/2013 | Liaw et al. | |
| 2013/0100087 A1 | 4/2013 | Liaw et al. | |
| 2013/0106802 A1 | 5/2013 | Liaw et al. | |
| 2013/0188336 A1 | 7/2013 | Yuan et al. | |
| 2013/0257812 A1 | 10/2013 | Wang et al. | |
| 2016/0299586 A1 | 10/2016 | Wang et al. | |
| 2017/0285789 A1* | 10/2017 | Barel | G06F 3/0412 |
| 2018/0348936 A1* | 12/2018 | He | G06K 9/0004 |

FOREIGN PATENT DOCUMENTS

| | | |
|---|---|---|
| CN | 101464579 A | 6/2009 |
| CN | 102122216 A | 7/2011 |
| CN | 103365439 A | 10/2013 |
| CN | 103729094 A | 4/2014 |
| CN | 106383598 A | 2/2017 |
| CN | 107066151 A | 8/2017 |

* cited by examiner

DIGITIZER, SIGNAL TRANSMISSION DEVICE, DIGITIZER DEVICE AND CONTROL METHODS THEREOF

CROSS-REFERENCE TO RELATED APPLICATION

The present application claims a priority to Chinese Patent Application No. 201711014772.0 filed on Oct. 25, 2017, the disclosure of which is incorporated herein by reference in its entirety.

TECHNICAL FIELD

The present disclosure relates to the field of input device for computer, and in particular to a digitizer, a signal transmission device, a digitizer device, and methods for controlling a digitizer, a signal transmission device and a digitizer device.

BACKGROUND

A digitizer is an important input device for a visual designer. In related technologies, a digitizer mainly operates on the basis of electromagnetic induction. The digitizer includes a circuit board with horizontal and vertical lines distributed uniformly, and magnetic fields crossing each other are generated above the digitizer. When a tip of a stylus moves on the digitizer, the magnetic fields are cut by the tip to generate an electric signal. Then, a location of the tip on the digitizer is determined via a chip of the digitizer. When the location of the tip of the stylus on the digitizer in the related technologies is mainly determined on the basis of electromagnetic induction, the magnetic fields generated by the digitizer are susceptible to the external interference.

SUMMARY

In one aspect, the present disclosure provides in some embodiments a digitizer, including an operating panel and a first processor. The operating panel is provided with multiple photoelectric sensors. The multiple photoelectric sensors are coupled to the first processor, and configured to receive an optical signal, convert the optical signal into a first electric signal, and transmit the first electric signal to the first processor. The first processor is configured to determine, in accordance with the first electric signal, a location of a photoelectric sensor of the multiple photoelectric sensors, where the photoelectric sensor has received the optical signal.

In a possible embodiment of the present disclosure, the operating panel is a display panel including multiple pixel units arranged in an array form, and there is a one-to-one correspondence between locations of the multiple photoelectric sensors and locations of the multiple pixel units. The first processor is further configured to control the display panel to cause a pixel unit, corresponding to the location of the photoelectric sensor which has received the optical signal, to emit light.

In a possible embodiment of the present disclosure, the digitizer further includes a display panel coupled to the first processor, and the first processor is further configured to control, in accordance with the location of the photoelectric sensor which has received the optical signal, the display panel to display.

In a possible embodiment of the present disclosure, the multiple photoelectric sensors are further configured to acquire a flicker frequency of the optical signal, convert the optical signal having the flicker frequency into a second electric signal, and transmit the second electric signal to the first processor. The first processor is further configured to control, in accordance with the second electric signal, the display panel to display a line.

In a possible embodiment of the present disclosure, the first processor is configured to determine, in accordance with a frequency of the second electric signal, a thickness of the line corresponding to the second electric signal, where the thickness of the line varies with the frequency of the second electric signal.

In a possible embodiment of the present disclosure, the first processor is configured to determine, in accordance with a pre-stored correspondence between a frequency of an electric signal and a thickness of a line, a thickness of the line corresponding to the second electric signal.

In another aspect, the present disclosure provides in some embodiments a signal transmission device, including a light source, a stroboscope, a pressure sensor and a second processor. The light source is configured to generate an optical signal. The pressure sensor is coupled to the second processor, and configured to detect a pressure applied to the signal transmission device, and transmit the pressure to the second processor. The second processor is further coupled to the stroboscope and configured to generate a flicker frequency of the optical signal corresponding to the pressure, and transmit the flicker frequency to the stroboscope. The stroboscope is further coupled to the light source, and configured to control the light source to generate the optical signal having the flicker frequency.

In a possible embodiment of the present disclosure, the signal transmission device further includes a power source configured to supply power to the signal transmission device.

In yet another aspect, the present disclosure provides in some embodiments a digitizer device, including a digitizer and a signal transmission device. The digitizer includes an operating panel and a first processor, the operating panel is provided with multiple sensors coupled to the first processor, the multiple photoelectric sensors are configured to receive an optical signal, convert the optical signal into a first electric signal, and transmit the first electric signal to the first processor, and the first processor is configured to determine, in accordance with the first electric signal, a location of the photoelectric sensor of the multiple photoelectric sensors, where the photoelectric sensor has received the optical signal. The signal transmission device comprises a light source configured to generate an optical signal.

In a possible embodiment of the present disclosure, the signal transmission device further includes a stroboscope, a pressure sensor and a second processor, the pressure sensor is coupled to the second processor, and configured to detect a pressure applied to the signal transmission device, and transmit the pressure to the second processor, the second processor is further coupled to the stroboscope and configured to generate a flicker frequency of the optical signal corresponding to the pressure, and transmit the flicker frequency to the stroboscope, and the stroboscope is further coupled to the light source, and configured to control the light source to generate the optical signal having the flicker frequency.

In a possible embodiment of the present disclosure, the optical signal received by the photoelectric sensor is the optical signal generated by the signal transmission device;

and the pressure applied to the signal transmission device is a pressure applied when a pattern is drawn by the signal transmission on the digitizer.

In still yet another aspect, the present disclosure provides in some embodiments a method for controlling a digitizer, applied to the above-mentioned digitizer, including: receiving, by a photoelectric sensor of the multiple photoelectric sensors, an optical signal, and converting the optical signal into a first electric signal; transmitting, by the photoelectric sensor, the first electric signal to the first processor; and determining, by the first processor, in accordance with the first electric signal, a location of the photoelectric sensor which has received the optical signal.

In a possible embodiment of the present disclosure, when the operating panel is a display panel or the digitizer further includes a display panel, the method further includes: controlling, by the first processor, in accordance with the location of the photoelectric sensor which has received the optical signal, the display panel to display.

In a possible embodiment of the present disclosure, the method further includes: acquiring, by the photoelectric sensor, a flicker frequency of the optical signal, and converting the optical signal having the flicker frequency into a second electric signal; transmitting, by the photoelectric sensor, the second electric signal to the first processor; and controlling, by the first processor, in accordance with the second electric signal, the display panel to display a line.

In a possible embodiment of the present disclosure, a thickness of the line corresponding to the second electric signal is determined by the first processor in accordance with a frequency of the second electric signal, and the thickness of the line varies with the frequency of the second electric signal In a possible embodiment of the present disclosure, a thickness of the line corresponding to the second electric signal is determined by the first processor in accordance with a pre-stored correspondence between a frequency of an electric signal and a thickness of a line.

In still yet another aspect, the present disclosure provides in some embodiments a method for controlling a signal transmission device, applied to the above-mentioned signal transmission device, including: controlling the light source of the signal transmission device to generate an optical signal; detecting, by the pressure sensor, a pressure applied to the signal transmission device, and transmitting the pressure to the second processor; determining, by the second processor, a flicker frequency of the optical signal corresponding to the pressure, and transmitting the flicker frequency to the stroboscope; and controlling, by the stroboscope, the light source to generate the optical signal having the flicker frequency.

In still yet another aspect, the present disclosure provides in some embodiments a method for controlling a digitizer device, applied to the above-mentioned digitizer device, including: generating, by the light source of the signal transmission device, an optical signal, when a pattern is drawn by the signal transmission device on the digitizer; receiving, by a photoelectric sensor of the multiple photoelectric sensors of the digitizer, the optical signal, and converting the optical signal into a first electric signal; transmitting, by the photoelectric sensor, the first electric signal to the first processor; and determining, by the first processor, in accordance with the first electric signal, a location of the signal transmission device.

In a possible embodiment of the present disclosure, when the operating panel is a display panel or the digitizer further includes a display panel, the method further includes: controlling, by the first processor, in accordance with a location of the photoelectric sensor which has received the optical signal, the display panel to display.

In a possible embodiment of the present disclosure, the signal transmission device further includes: a stroboscope, a pressure sensor and a second processor; the pressure sensor is coupled to the second processor, and configured to detect a pressure applied to the signal transmission device, and transmit the pressure to the second processor; the second processor is further coupled to the stroboscope and configured to generate a flicker frequency of the optical signal corresponding to the pressure, and transmit the flicker frequency to the stroboscope; and the stroboscope is further coupled to the light source, and configured to control the light source to generate the optical signal having the flicker frequency; and the method further includes: detecting, by the pressure sensor, a drawing pressure, and transmitting the drawing pressure to the second processor, when a pattern is drawn by the signal transmission device on the digitizer and the drawing pressure is applied to the signal transmission device; determining, by the second processor, a flicker frequency of the optical signal corresponding to the drawing pressure; controlling, by the stroboscope, the light source to generate the optical signal having the flicker frequency; receiving, by the photoelectric sensor of the digitizer, the optical signal having the flicker frequency, and converting the optical signal having the flicker frequency into a second electric signal; transmitting, by the photoelectric sensor, the second electric signal to the first processor; and controlling, by the first processor, in accordance with the second electric signal, the display panel to display a line.

BRIEF DESCRIPTION OF THE DRAWINGS

In order to illustrate the technical solutions in embodiments of the present disclosure or in the related technologies in a clearer manner, the drawings used in descriptions of the embodiments of the present disclosure or the related technologies will be described hereinafter briefly. Apparently, the drawings merely illustrate some embodiments of the present disclosure, and based on these drawings, a person skilled in the art may obtain other drawings without any creative effort.

DETAILED DESCRIPTION OF THE EMBODIMENTS

In order to make the objects, the technical solutions and the advantages of the present disclosure clearer, the technical solutions in embodiments of the present disclosure will be described hereinafter in a clear and complete manner in conjunction with the drawings of embodiments. Apparently, the embodiments described herein are merely a part of, rather than all of, the embodiments of the present disclosure. All other embodiments obtained based on the embodiments of the present disclosure by those skilled in the art without any creative efforts fall within the protection scope of the present disclosure.

The present disclosure is to provide a digitizer, a signal transmission device, a digitizer device and control methods thereof, to prevent the occurrence of electromagnetic interference in the related technologies.

The present disclosure provides in some embodiments a digitizer. Reference is made to FIGS. 1 to 3 and 10. The digitizer includes an operating panel 10 and a first processor 20. The operating panel 10 is provided with multiple photoelectric sensors 11. The multiple photoelectric sensors 11 are coupled to the first processor 20, and configured to receive an optical signal, convert the optical signal into a first electric signal, and transmit the first electric signal to the first processor 20. The first processor 20 is configured to determine, in accordance with the first electric signal, a location of a photoelectric sensor 11 of the multiple photoelectric sensors 11, where the photoelectric sensor has received the optical signal.

Figure 1:
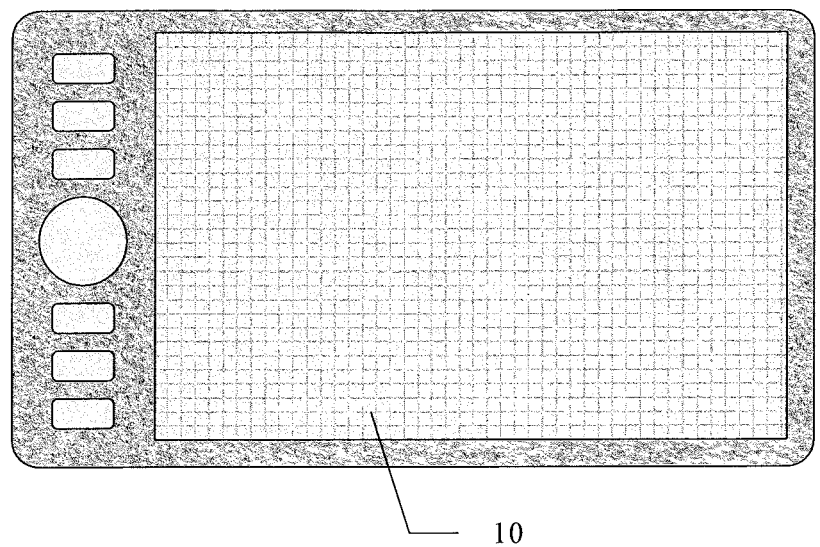
FIG. 1 is a planar view of a digitizer according to an embodiment of the present disclosure.

In a possible embodiment of the present disclosure, the operating panel 10 may be a region on the digitizer, which is for performing operations such as drawing, as shown in FIG. 1. In actual application, a display panel for displaying a pattern is usually needed. In an implementation, the digitizer may further include a display panel coupled to the first processor 20 and configured to display a line corresponding to the location of the photoelectric sensor which has received the optical signal.

Figure 2:
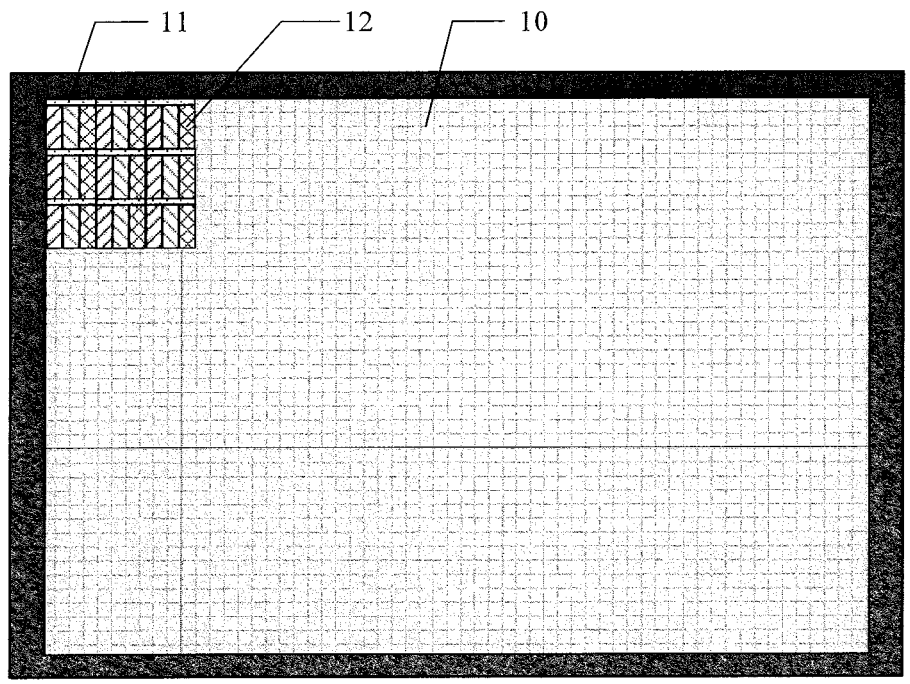
FIG. 2 is a schematic view of an operating panel according to an embodiment of the present disclosure.
Figure 3:
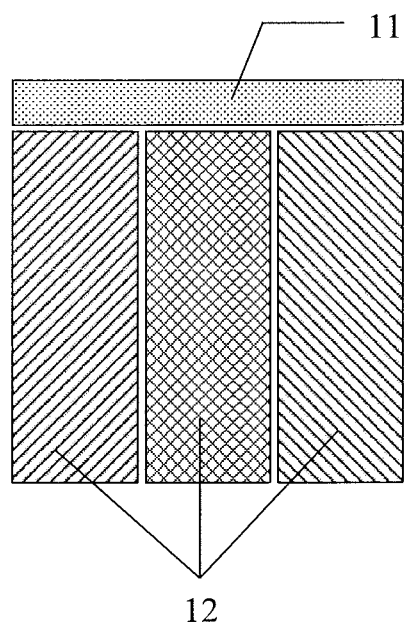
FIG. 3 is a planar view of arrangement of a pixel unit and a photoelectric sensor according to an embodiment of the present disclosure.

In another implementation, as shown in FIG. 2, the operating panel 10 may be a display panel, which is not only configured to perform operations such as drawing, but also configured to display the line corresponding to the location of the photoelectric sensor 11 which has received the optical signal. The display panel may include multiple pixel units 12 arranged in an array form. In FIG. 2, merely part of the pixel units 12 are shown at an upper left corner. The photoelectric sensors 11 may be arranged in various ways. For example, one photoelectric sensor 11 may be shared by multiple pixel units 12, or, there may be a one-to-one correspondence between location of the photoelectric sensors 11 and locations of the pixel units 12. As shown in FIG. 3, each pixel unit 12 may include three subpixels, red (R), green (G) and blue (B), and the photoelectric sensor 11 may be arranged above the pixel unit 12, so as to achieving positioning at a pixel level. In order to further improve sensitivity and display resolution, the pixel unit 12 may further include one subpixel R, G or B. In addition, positions and structures of the photoelectric sensors 11 and the pixel units 12 may be set in various forms, which is not limited herein.

The display panel may be a thin film transistor-liquid crystal display (TFT-LCD) or organic light-emitting diode (OLED) panel.

According to the embodiments of the present disclosure, the digitizer is provided, which includes the operating panel and the first processor. The operating panel is provided with the multiple photoelectric sensors. The multiple photoelectric sensors are configured to receive an external optical signal, convert the optical signal into an electric signal, and transmit the electric signal to the first processor. The first processor is configured to determine, in accordance with the electric signal, a location where the optical signal is received. In the technical solutions of the embodiments, the digitizer senses and processes the optical signal, to determine a drawing or writing location on the digitizer. As a result, as compared with the related technologies, the occurrence of electromagnetic interference is prevented. In addition, there is no need to provide a circuit board for generating magnetic fields, which reduces cost.

In another embodiment of the present disclosure, the photoelectric sensors 11 may be further configured to receive a flicker frequency of the optical signal, convert the optical signal having the flicker frequency into a second electric signal, and transmit the second electric signal to the first processor 20. The first processor 20 may be configured to control, in accordance with the second electric signal, the display panel to perform a corresponding operation. For example, the corresponding operation may include displaying a line with a certain thickness. The thickness of the line is determined in accordance with a feature of the second electric signal, e.g., a frequency of the second electric signal. For example, the thickness of the line may be determined by the first processor 20 in accordance with a pre-stored correspondence between a frequency of an electric signal and a thickness of a line. In a possible embodiment of the present disclosure, the thickness of the line varies with the frequency of the second electric signal. For example, the thickness of the line increases as the frequency of the second electric signal increases, or, the thickness of the line decreases as the frequency of the second electric signal increases.

To be specific, upon receipt of the external optical signal having the flicker frequency, the photoelectric sensor 11 may convert the optical signal into an electric signal having a certain frequency and transmit it to the first processor 20. The frequency of the electric signal may be the same as, or different from, the flicker frequency of the optical signal. The first processor 20 may determine a pressure applied to the digitizer in accordance with a pre-stored correspondence between a frequency of an electric signal and a pressure applied to the digitizer, and then control the display panel to display the line with a certain thickness. The correspondence between the frequency of the electric signal and the pressure applied to the digitizer may be determined in advance through theoretical calculation and experimental simulation. The thickness of the line may be determined in accordance with a pre-stored correspondence between a pressure applied to the digitizer and a thickness of a line. The correspondence between the pressure applied to the digitizer and the thickness of the line may be determined in advance through theoretical calculation and experimental simulation. In this way, the drawing operation may be performed in accordance with the thickness and the location of the line determined according to the embodiments of the present disclosure.

In actual application, in order to prevent the interference from an ambient light beam, a frequency of each optical signal received by the photoelectric sensor may be identified. For example, some frequency ranges may be used for the signal transmission. In this case, only optical signals with these frequency ranges may be processed, and optical signals with other frequency ranges may not be processed, so as to prevent the interference of the ambient light beam.

Figure 4:
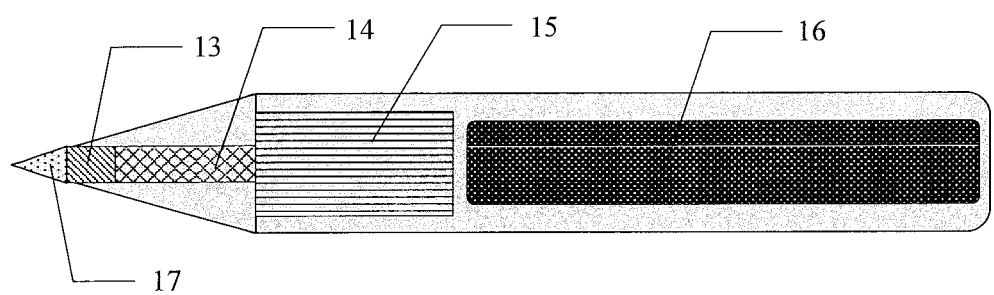
FIG. 4 is a sectional view of a signal transmission device according to an embodiment of the present disclosure.

The present disclosure further provides in some embodiments a signal transmission device. Reference is made to FIG. 4. The signal transmission device includes a light source 17 configured to generate an optical signal. In actual application, the signal transmission device may be a stylus for a digitizer device.

When the signal transmission device according to the embodiment of the present disclosure is used to draw a pattern on a digitizer of a digitizer device, the light source 17 generates the optical signal, and the digitizer receives the optical signal to determine a location of the signal transmission device in accordance with the optical signal. In this way, occurrence of electromagnetic interference in positioning process of a digitizer device in the related technologies is prevented.

In a possible embodiment of the present disclosure, as shown in FIG. 4, the signal transmission device may further include a stroboscope 13, a pressure sensor 14 and a second processor 15. The pressure sensor 14 is coupled to the second processor 15, and configured to detect a pressure applied to the signal transmission device, and transmit the pressure to the second processor 15. The second processor 15 is coupled to the pressure sensor 14 and the stroboscope 13, and configured to determine a flicker frequency of the optical signal corresponding to the pressure in accordance with the pressure applied to the signal transmission device. The stroboscope 13 is coupled to the light source 17 and the second processor 15, and configured to control the light source 17 to generate the optical signal having the flicker frequency in accordance with the determined flicker frequency.

To be specific, the pressure sensor 14 may be arranged close to a drawing end of the signal transmission device, and configured to detect the pressure applied to the signal transmission device and transmit the pressure to the second processor 15. The second processor 15 may be configured to process the pressure from the pressure sensor, and determine the flicker frequency of the optical signal corresponding to the pressure in accordance with a pre-stored correspondence between the pressure and the flicker frequency. Then, the stroboscope 13 may control the light source 17 to generate the optical signal having the flicker frequency. The light source 17 may generate optical signals having different frequencies. The light source 17 may be, for example, a light-emitting diode (LED) light source. Correspondingly, the stroboscope 13 may control the LED light source to generate an optical signal having a high frequency. An on state and an off state of the LED light source may represent 0 and 1 the digital signal transmission respectively, and different signals, e.g., different pressure levels applied to the signal transmission device, may be transmitted on the basis of the flicker frequencies of the LED light source. The correspondence between the pressure applied to the signal transmission device and the flicker frequency may be determined in advance through theoretical calculation and experimental simulation. In actual application, the signal transmission device may further include a power source 16 configured to supply power to the signal transmission device. In the embodiments of the present disclosure, by transmitting the optical signal having the flicker frequency corresponding to the pressure applied to the signal transmission device, the location of the signal transmission device and information about the pressure are transmitted.

The present disclosure further provides in some embodiments a digitizer device including the above-mentioned digitizer and the above-mentioned signal transmission device.

To be specific, an optical signal received by the photoelectric sensor of the digitizer may be an optical signal generated by the light source 17 of the signal transmission device, and a pressure applied to the signal transmission device may be a pressure applied when a pattern is drawn by the signal transmission device on the digitizer.

When a pattern is drawn by the signal transmission device on the digitizer, the light source 17 of the signal transmission device may generate the optical signal. The photoelectric sensor at a location corresponding to the signal transmission device may receive the optical signal, convert the optical signal into the first electric signal, and transmit the first electric signal to the first processor. The first processor may determine a location of the signal transmission device in accordance with the first electric signal. When the operating panel is a display panel or the digitizer further includes a display panel, the first processor may control the display panel to display a line corresponding to the location of the signal transmission device. When the operating panel is a display panel and each pixel unit corresponds to one photoelectric sensor, the location of the signal transmission device can be determined at a pixel level.

When a pattern is drawn by the signal transmission device on the digitizer, a drawing pressure is applied to the signal transmission device. The pressure sensor may detect the drawing pressure, and transmit it to the second processor. The second processor may determine, based on the drawing pressure, a flicker frequency of the optical signal corresponding to the drawing pressure. The stroboscope may control, based on the flicker frequency, the light source 17 to generate the optical signal having the flicker frequency. The photoelectric sensor of the digitizer may receive the optical signal having the flicker frequency, convert it into the second electric signal, and transmit the second electric signal to the first processor. The first processor may control, based on the second electric signal, the display panel to display a line with a certain thickness. The drawing pressure is obtained in accordance with a frequency of the second electric signal, and then the line with a certain thickness is determined.

In this way, information about the location and the pressure is transmitted via the optical signal generated by the signal transmission device, and then received and processed by the digitizer, so as to acquire the location of the line and the thickness of the line determined based on the pressure. As a result, the display panel is controlled to perform corresponding display, achieving a drawing operation.

Figure 5:
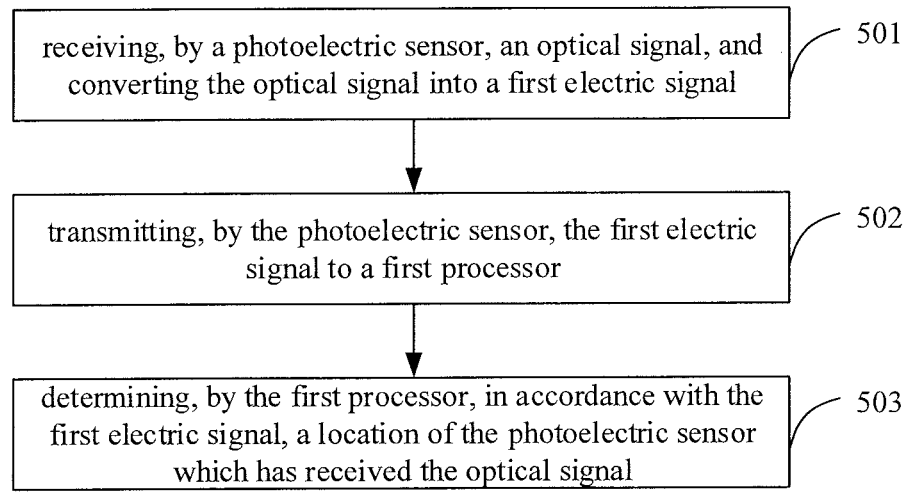
FIG. 5 is a flow chart of a method for controlling a digitizer according to an embodiment of the present disclosure.

The present disclosure further provides in some embodiments a method for controlling a digitizer, which is applied to the digitizer according to the above embodiments, as shown in FIG. 5. The method may include steps 501 to 503. In step 501, a photoelectric sensor of the multiple photoelectric sensors receives an optical signal, and converts the optical signal into a first electric signal. In step 502, of the photoelectric sensor transmits the first electric signal to the first processor. In step 503, the first processor determines a location of the photoelectric sensor which has received the optical signal in accordance with the first electric signal.

In a possible embodiment of the present disclosure, when the operating panel is a display panel or the digitizer further includes a display panel, the method further includes: controlling, by the first processor, the display panel to display a line corresponding to the location of the photoelectric sensor which has received the optical signal.

Figure 6:
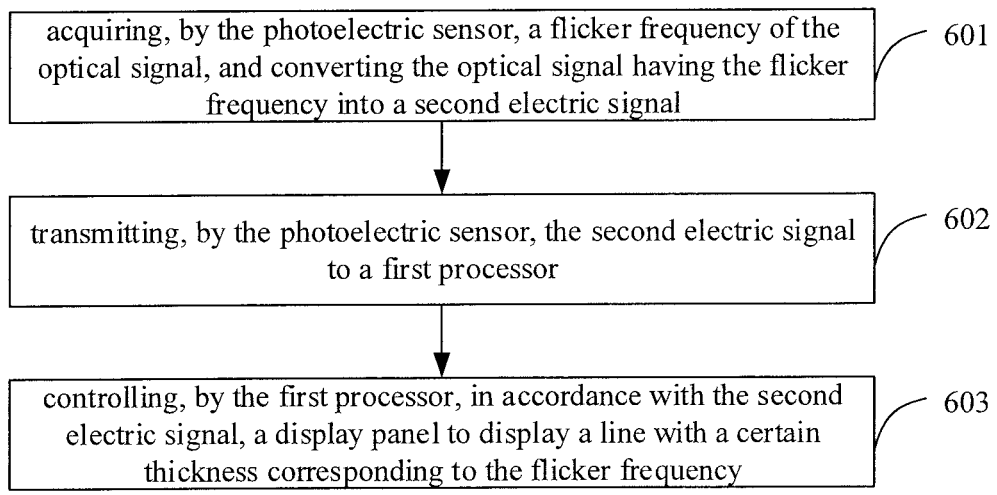
FIG. 6 is another flow chart of a method for controlling a digitizer according to an embodiment of the present disclosure.

In another possible embodiment of the present disclosure, as shown in FIG. 6, the method may further include steps 601 to 603. In step 601, the photoelectric sensor obtains a flicker frequency of the optical signal, and converts the optical signal having the flicker frequency into a second electric signal. In step 602, the photoelectric sensor transmits the second electric signal to the first processor. In step 603, the first processor controls the display panel to display a line with a certain thickness corresponding to the flicker frequency in accordance with the second electric signal.

The present disclosure further provides in some embodiments a method for controlling a signal transmission device, which is applied to the signal transmission device according to the above embodiments. The method may include controlling the light source 17 of the signal transmission device to generate an optical signal.

Figure 7:
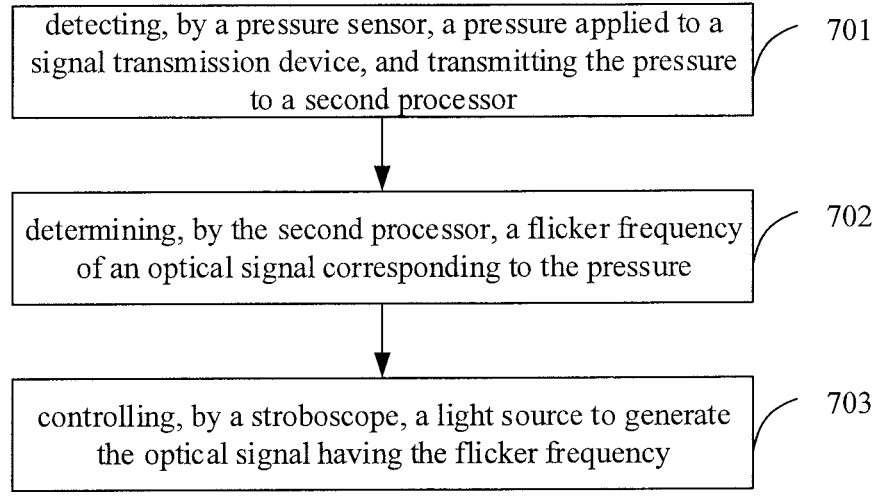
FIG. 7 is a flow chart of a method for controlling a signal transmission device according to an embodiment of the present disclosure.

In a possible embodiment of the present disclosure, as shown in FIG. 7, when the signal transmission device includes the stroboscope, the pressure sensor and the second processor, the method may further include steps 701 to 703. In step 701, the pressure sensor detects a pressure applied to the signal transmission device, and transmits the pressure to the second processor. In step 702, the second processor determines a flicker frequency of the optical signal corresponding to the pressure. In step 703, the stroboscope controls the light source 17 to generate the optical signal having the flicker frequency.

Figure 8:
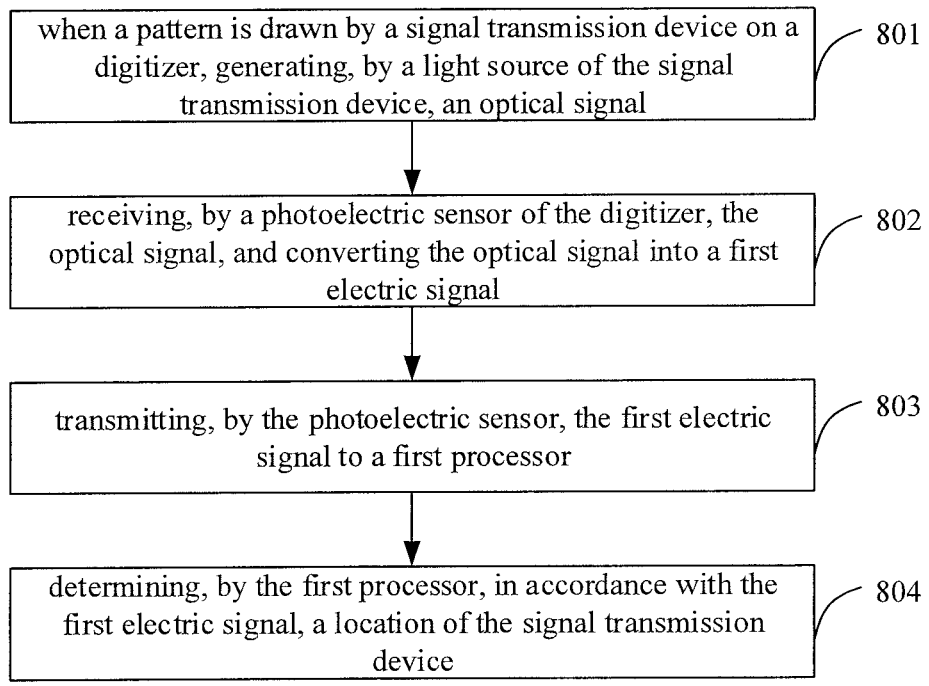
FIG. 8 is a flow chart of a method for controlling a digitizer device according to an embodiment of the present disclosure.

The present disclosure further provides in some embodiments a method for controlling a digitizer device, which is applied to the digitizer device according to the above embodiments, as shown in FIG. 8. The method may include steps 801 to 804. In step 801, when a pattern is drawn by the signal transmission device on the digitizer, the light source 17 of the signal transmission device generates an optical signal. In step 802, a photoelectric sensor of the multiple photoelectric sensors of the digitizer receives the optical signal, and converts the optical signal into a first electric signal. In step 803, the photoelectric sensor transmits the first electric signal to the first processor. In step 804, the first processor determines a location of the signal transmission device in accordance with the first electric signal.

In a possible embodiment of the present disclosure, when the operating panel is a display panel or the digitizer further includes a display panel, the method may further include controlling, by the first processor, the display panel to display a line corresponding to the location of the signal transmission device.

Figure 9:
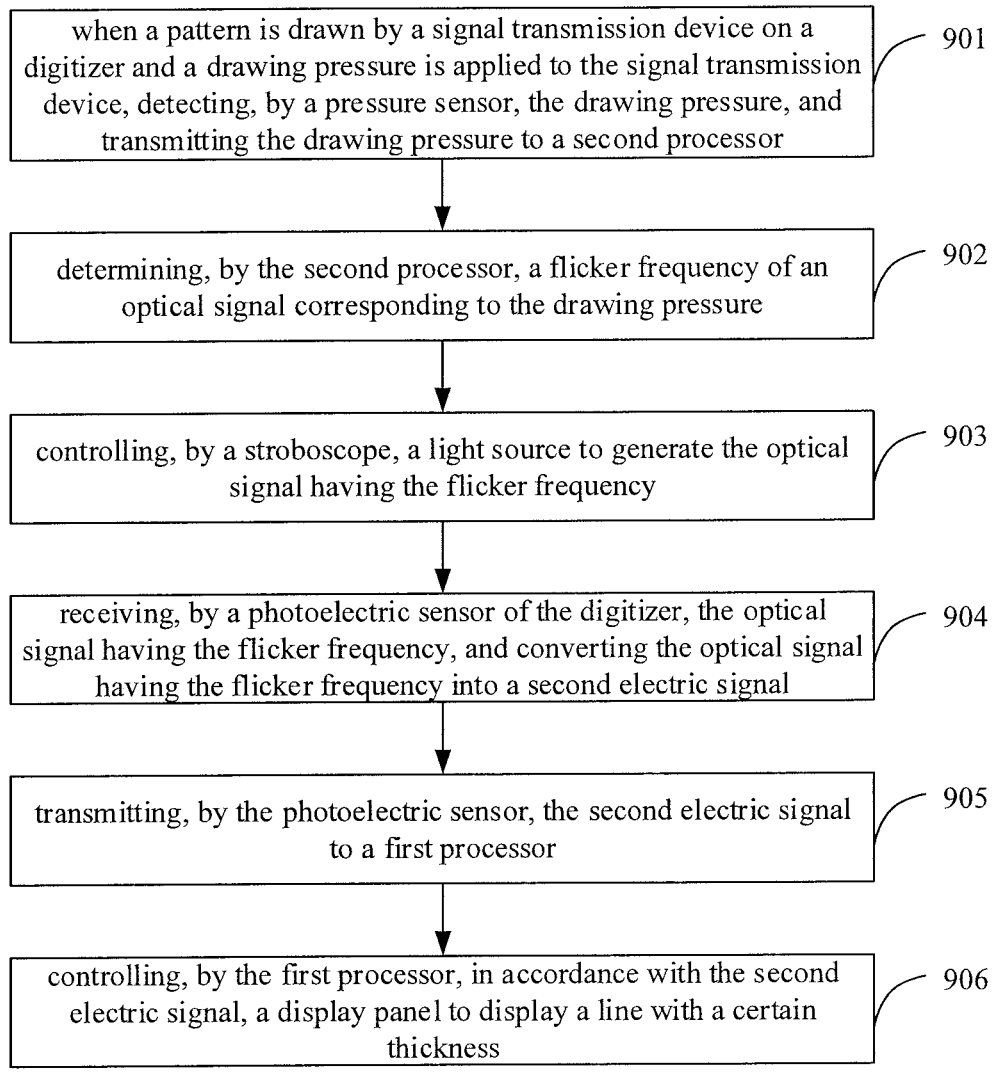
FIG. 9 is another flow chart of a method for controlling a digitizer device according to an embodiment of the present disclosure.
Figure 10:
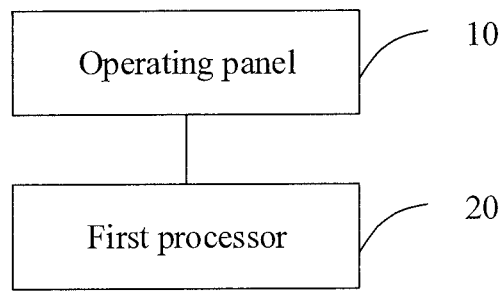
FIG. 10 is a block diagram of a digitizer according to an embodiment of the present disclosure.

In a possible embodiment of the present disclosure, as shown in FIG. 9, when the signal transmission device further includes the stroboscope, the pressure sensor and the second processor, the method may further include steps 901 to 906. In step 901, when a pattern is drawn by the signal transmission device on the digitizer and a drawing pressure is applied to the signal transmission device, the pressure sensor detects the drawing pressure, and transmits the drawing pressure to the second processor. In step 902, the second processor determines a flicker frequency of the optical signal corresponding to the drawing pressure. In step 903, the stroboscope controls the light source 17 to generate the optical signal having the flicker frequency. In step 904, the photoelectric sensor of the digitizer receives the optical signal having the flicker frequency, and converts the optical signal having the flicker frequency into a second electric signal. In step 905, the photoelectric sensor transmits the second electric signal to the first processor. In step 906, the first processor controls the display panel to display a line with a certain thickness in accordance with the second electric signal.

The digitizer, the signal transmission device, the digitizer device and the control methods thereof are provided according to the embodiments of the present disclosure. The digitizer includes the operating panel and the first processor. The operating panel is provided with the multiple photoelectric sensors. The multiple photoelectric sensors are configured to receive an external optical signal, convert the optical signal into an electric signal, and transmit the electric signal to the first processor. The first processor is configured to determine, in accordance with the electric signal, a location where the optical signal is received. In the technical solutions of the embodiments, the digitizer senses and processes the optical signal, to determine a drawing or writing location on the digitizer. As a result, as compared with the related technologies, the occurrence of electromagnetic interference is prevented. In addition, there is no need to provide a circuit board for generating magnetic fields, which reduces cost.

Various embodiments in the specification are described in a progressive manner, differences from other embodiments are emphatically illustrated in each embodiment, and reference can be made to each other for understanding the same or similar sections.

It should also be noted that in the specification, relational terms such as the first or the second are only used to differentiate one entity or operation from another entity or operation, rather than require or indicate any actual relation or sequence between the entities or operations. Moreover, terms "include", "have" or any other variants thereof are meant to cover non-exclusive inclusion, so that the process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

The digitizer, the signal transmission device, the digitizer device, and the methods for controlling the digitizer, the signal transmission device and the digitizer device according to the embodiments of the present disclosure are described in detail in the above. Specific examples are used herein for illustrate the principle and embodiments of the present disclosure. The above embodiments are only for facilitating the understanding of the method and core ideas of the present disclosure. In addition, for those skilled in the art, changes can be made to the specific implementations and application scope of the present disclosure based on the ideas of the present disclosure. In conclusion, the present disclosure is not limited by the specification.

What is claimed is:

1. A digitizer, comprising: an operating panel; and a first processor; wherein the operating panel is provided with a plurality of photoelectric sensors coupled to the first processor;

wherein the plurality of photoelectric sensors are configured to receive an optical signal, convert the optical signal into a first electric signal, and transmit the first electric signal to the first processor; and wherein the first processor is configured to determine, in accordance with the first electric signal, a location of a photoelectric sensor of the plurality of photoelectric sensors, and wherein the photoelectric sensor has received the optical signal.

2. The digitizer according to claim 1, wherein the operating panel is a display panel comprising a plurality of pixel units arranged in an array form, and there is a one-to-one correspondence between locations of the plurality of photoelectric sensors and locations of the plurality of pixel units; and wherein the first processor is further configured to control the display panel to cause a pixel unit, corresponding to the location of the photoelectric sensor which has received the optical signal, to emit light.

3. The digitizer according to claim 1, further comprising a display panel coupled to the first processor, wherein the first processor is further configured to control, in accordance with the location of the photoelectric sensor which has received the optical signal, the display panel to display.

4. The digitizer according to claim 2, wherein the plurality of photoelectric sensors is further configured to acquire a flicker frequency of the optical signal, convert the optical signal having the flicker frequency into a second electric signal, and transmit the second electric signal to the first processor, and wherein the first processor is further configured to control, in accordance with the second electric signal, the display panel to display a line.

5. The digitizer according to claim 4, wherein the first processor is configured to determine, in accordance with a frequency of the second electric signal, a thickness of the line corresponding to the second electric signal, and wherein the thickness of the line varies with the frequency of the second electric signal.

6. The digitizer according to claim 4, wherein the first processor is configured to determine, in accordance with a pre-stored correspondence between a frequency of an electric signal and a thickness of a line, a thickness of the line corresponding to the second electric signal.

7. A digitizer device, comprising a digitizer and a signal transmission device;

wherein the digitizer comprises an operating panel and a first processor, the operating panel is provided with a plurality of photoelectric sensors coupled to the first processor, the plurality of photoelectric sensors are configured to receive an optical signal, convert the optical signal into a first electric signal, and transmit the first electric signal to the first processor, and the first processor is configured to determine, in accordance with the first electric signal, a location of the photoelectric sensor of the plurality of photoelectric sensors, and wherein the photoelectric sensor has received the optical signal; and wherein the signal transmission device comprises a light source configured to generate an optical signal.

8. The digitizer device according to claim 7, wherein the signal transmission device further comprises a stroboscope, a pressure sensor and a second processor, the pressure sensor is coupled to the second processor, and configured to detect a pressure applied to the signal transmission device, and transmit the pressure to the second processor, the second processor is further coupled to the stroboscope and configured to generate a flicker frequency of the optical signal corresponding to the pressure, and transmit the flicker frequency to the stroboscope, and the stroboscope is further coupled to the light source, and configured to control the light source to generate the optical signal having the flicker frequency.

9. The digitizer device according to claim 8, wherein the optical signal received by the photoelectric sensor is the optical signal generated by the signal transmission device; and wherein the pressure applied to the signal transmission device is a pressure applied when a pattern is drawn by the signal transmission on the digitizer.

10. A method for controlling a digitizer, applied to the digitizer according to claim 1, comprising:

receiving, by a photoelectric sensor of the plurality of photoelectric sensors, an optical signal, and converting the optical signal into a first electric signal;

transmitting, by the photoelectric sensor, the first electric signal to the first processor; and determining, by the first processor, in accordance with the first electric signal, a location of the photoelectric sensor which has received the optical signal.

11. The method according to claim 10, wherein when the operating panel is a display panel or the digitizer further comprises a display panel, the method further comprises:

controlling, by the first processor, in accordance with the location of the photoelectric sensor which has received the optical signal, the display panel to display.

12. The method according to claim 11, further comprising:

acquiring, by the photoelectric sensor, a flicker frequency of the optical signal, and converting the optical signal having the flicker frequency into a second electric signal;

transmitting, by the photoelectric sensor, the second electric signal to the first processor; and controlling, by the first processor, in accordance with the second electric signal, the display panel to display a line.

13. The method according to claim 12, wherein a thickness of the line corresponding to the second electric signal is determined by the first processor in accordance with a frequency of the second electric signal, and wherein the thickness of the line varies with the frequency of the second electric signal.

14. The method according to claim 12, wherein a thickness of the line corresponding to the second electric signal is determined by the first processor in accordance with a pre-stored correspondence between a frequency of an electric signal and a thickness of a line.

15. A method for controlling a digitizer device, applied to the digitizer according to claim 7, comprising:

generating, by the light source of the signal transmission device, an optical signal, when a pattern is drawn by the signal transmission device on the digitizer;

receiving, by a photoelectric sensor of the plurality of photoelectric sensors of the digitizer, the optical signal, and converting the optical signal into a first electric signal;

transmitting, by the photoelectric sensor, the first electric signal to the first processor; and determining, by the first processor, in accordance with the first electric signal, a location of the signal transmission device.

16. The method according to claim 15, wherein when the operating panel is a display panel or the digitizer further comprises a display panel, the method further comprises:

controlling, by the first processor, in accordance with a location of the photoelectric sensor which has received the optical signal, the display panel to display.

17. The method according to claim 16, wherein the signal transmission device further comprises: a stroboscope, a pressure sensor and a second processor;

the pressure sensor is coupled to the second processor, and configured to detect a pressure applied to the signal transmission device, and transmit the pressure to the second processor;

the second processor is further coupled to the stroboscope and configured to generate a flicker frequency of the optical signal corresponding to the pressure, and transmit the flicker frequency to the stroboscope; and the stroboscope is further coupled to the light source, and configured to control the light source to generate the optical signal having the flicker frequency; and the method further comprises:

detecting, by the pressure sensor, a drawing pressure, and transmitting the drawing pressure to the second processor, when a pattern is drawn by the signal transmission device on the digitizer and the drawing pressure is applied to the signal transmission device;

determining, by the second processor, a flicker frequency of the optical signal corresponding to the drawing pressure;

controlling, by the stroboscope, the light source to generate the optical signal having the flicker frequency;

receiving, by the photoelectric sensor of the digitizer, the optical signal having the flicker frequency, and converting the optical signal having the flicker frequency into a second electric signal;

transmitting, by the photoelectric sensor, the second electric signal to the first processor; and controlling, by the first processor, in accordance with the second electric signal, the display panel to display a line.

* * * * *